UNITED STATES PATENT OFFICE.

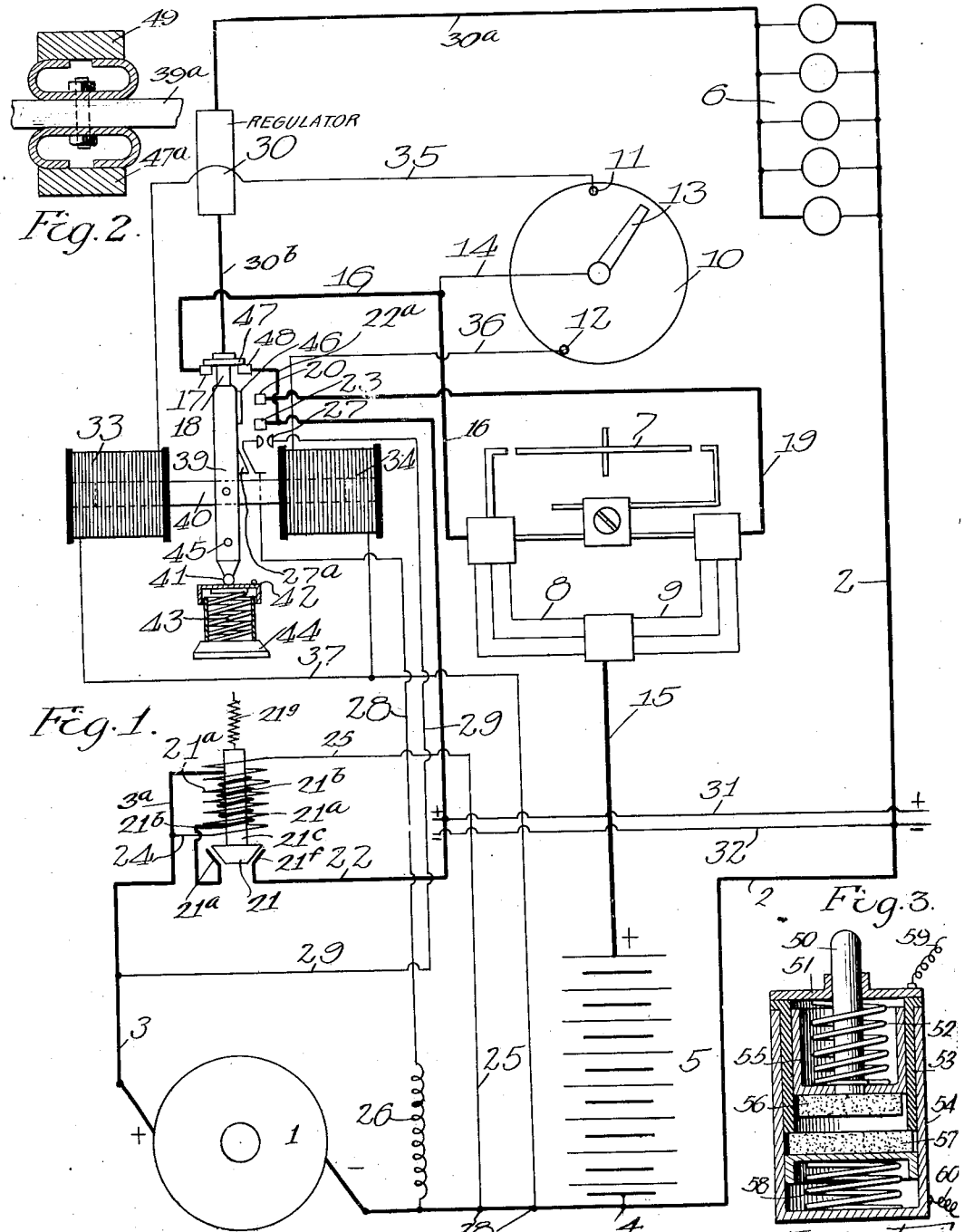

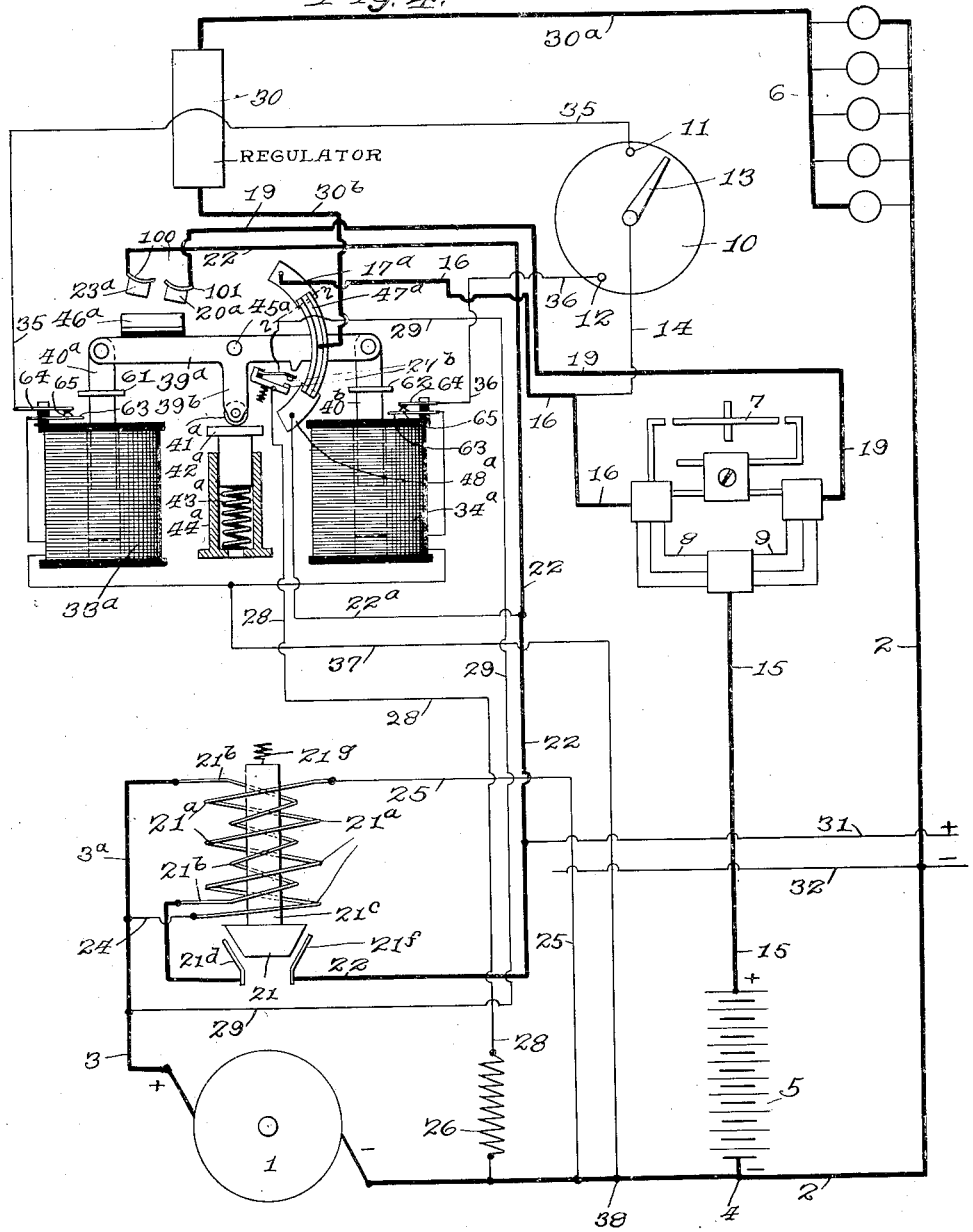

ROBERT C. LANPHIER, OF SPRINGFIELD, ILLINOIS, AND ERVIN M. FITZ, OF COLUMBUS, OHIO.

BATTERY-CONTROLLING DEVICE FOR AXLE-DRIVEN GENERATORS.

1,152,822.

Specification of Letters Patent.

Patented Sept. 7, 1915.

Application filed February 17, 1912. Serial No. 678,349.

*To all whom it may concern:*

Be it known that we, ROBERT C. LANPHIER and ERVIN M. FITZ, citizens of the United States, and residing at Springfield, in the county of Sangamon and State of Illinois, and at Columbus, in the county of Franklin and State of Ohio, respectively, have invented certain new and useful Improvements in Battery-Controlling Devices for Axle-Driven Generators, of which the following is a specification, reference being had to the accompanying drawings.

Our invention relates to improvements in measuring and controlling devices for use with storage batteries in connection with so-called "axle-driven generators" such as are employed for the electric lighting of railroad cars, and its main object is to provide a new and improved mechanism by which the control and operation of the battery involves always a nearly complete discharge of the battery after a full charge has been given to it, whether the train is running above critical speed or not. In general, all axle-driven generator systems in use at the present time for the lighting of railroad cars have a so-called "constant current generator" which furnishes practically the same amount of current at all train speeds above a certain minimum or critical speed at which the generator is thrown in circuit. In such cases current passes from the generator both to the lighting load and to the battery connected across the line, and by various arrangements of disconnecting switches the generator is cut off when the train is below a critical speed and the battery is cut off when its voltage reaches a maximum and the battery is supposed to be fully charged. In such systems means are also provided for cutting the battery in circuit to carry the lighting load when the train is below critical speed even though the battery may not at that time be fully charged. In general, the present methods of operating axle-driven generator equipments for such lighting of trains—that is to say, systems provided with axle-driven generators and storage batteries—are based upon always charging the battery when the train is above critical speed until the battery is charged, at which time the battery is cut off and the generator continues to carry the load until the train drops below the critical speed. In our system it is proposed to have the battery always carry the load—whether the generator is above critical speed or not—after the battery has been fully charged and until such time as the next maximum discharge point is reached. In other words, suppose the train is already above critical speed and battery charging, the generator does the lighting only until the battery is fully charged. As soon as the battery is fully charged, the generator is cut off and supplies no current to the load until the charge of the battery is reduced to the maximum discharge point—which is always arranged to be ahead of the actual maximum capacity of the battery—this being true no matter at what speed the train is running. At maximum discharge point, the generator is automatically cut in, provided the train is above critical speed, or as soon as the train arrives at critical speed, and operates to both charge the battery and light the train, carrying the load until the battery is fully charged, at which time the generator is automatically cut out until the battery has again reached its maximum discharge point. We introduce, therefore, into the system an ampere hour meter device which, in connection with sundry switching mechanisms to be hereinafter described, automatically operates to control the system, as above described.

An important advantage in our invention is that the battery in our system will pass practically through a complete charge and discharge at each alternate cycle. This results in keeping the battery in a much better condition and accordingly increasing its life as compared with what would be the result, if only a small portion of the total capacity is taken out at each discharge with periods of charging intervening. That is to say, in present systems of axle equipment the battery is usually discharged only, perhaps, say one-fourth to one-fifth of the rated capacity, after which it is charged, sometimes to an excessive degree. The result is that after a comparatively brief period the active material in the plates either becomes disintegrated or so hardened as to prevent the battery giving its proper rated capacity and having its supposed maximum life. In our system, the battery and ampere-hour meter are so arranged that the battery will be operated each time on discharge to a limit, say, about seven-eighths of its rated capacity so as to obviate the damaging effects of complete discharge and also in order to leave a sufficient amount of charge in the battery as a safety reserve. Following such a discharge, a proper charge is given each time by putting into the battery the number of ampere hours discharged plus a definite percentage, based upon the type and condition of the battery, so that a proper extra compensating charge is given to it.

Our invention also relates to other improvements in systems of battery controlling devices for axle-driven generators hereinafter specifically pointed out.

In the drawings,—Figure 1 is a diagrammatic view of our improvements; Fig. 2 is an enlarged detail, being a section on line 2—2 of Fig. 4. Fig. 3 is an enlarged detail, being a side elevation, partly in vertical section, of another form of subsidiary switch used in the main switch shown in Fig. 4. Fig. 4 is a diagrammatic view illustrating another form of main switch from that shown in Fig. 1.

Referring to the drawings,—1 indicates a direct current generator of any well-known type adapted to be driven from the axle of a moving train and is preferably a so-called "constant current generator" which is adapted to furnish practically the same amount of current at all train speeds above a certain minimum or critical speed. This generator in itself forms no part of our present invention. The generator 1 is connected to lines 2 and 3, and the line 2 is tapped off at a suitable point, as at 4, to a storage battery 5, which may be of any well-known and approved form and construction and which of itself forms no part of our present invention. The wire 2 also passes to the lighting load 6.

7 indicates an ampere hour mercury motor meter having a differential shunt 8—9 preferably of the type shown in Letters Patent to Robert C. Lanphier, No. 958,508, dated May 17, 1910, by means of which the meter in charging may be given any desired percentage of extra compensating charge, as described in said Letters Patent.

10 indicates the recording mechanism or dial of such meter, having a contact 11 at its maximum charge point and contact 12 at the maximum discharge point. This meter operates in the manner shown and described in said Letters Patent to Robert C. Lanphier. Other types of meter which perform the same general functions, however, may be used, but we prefer to use the meter of the type above described. The contact 11 is preferably fixed at the zero point of the dial and is a fixed contact, while contact 12 is adjustable in any well-known way at such other point as is necessary for the rated capacity of the battery with which the meter is used.

13 indicates the hand or lever of the recording train and it is connected by a wire 14 through the meter 7 to the plus side of the storage battery 5 and is adapted to make contact and close the circuit to the contacts 11 and 12. The storage battery 5 is connected by wire 15 to the middle point of the differential shunt in meter 7. The discharge end of the differential shunt 8 is connected by wire 16 to a contact 17 in switch 18 which will be described later. The other terminal on the side 9 of the differential shunt is connected by wire 19 to a contact 20, preferably carbon faced, which forms a part of the switch mechanism 18 which will be hereinafter fully described.

21 indicates a solenoid switch operated by a core $21^c$ upon which is mounted a coil $21^a$ connected across the generator line by suitable leads, as 24 and 25, as best shown in Fig. 4. The core $21^c$ also carries a coil $21^b$, one end of which is connected with the wire 3 by a wire $3^a$, the other end of said coil being connected with a spring contact $21^d$ placed at one side of the switch 21. At the opposite side of said switch is a similar spring contact $21^f$ which is connected by a wire 22 to a contact 23—preferably carbon—forming a part of the switch mechanism 18, which will be later described. The function of the latter switch is a well-known one and will be readily understood. It is to open the main line circuit from the generator to the battery and to the load when the voltage drops below a certain minimum or critical value, due to the train on which the system is installed running below a certain definite speed, and the opening of the switch thus prevents current passing back from the battery to the generator under such circumstances. The switch 21 is normally held out of contact with the contacts $21^d$—$21^f$ by a spring $21^g$. The solenoid switch 21 is adapted to close and remained closed when any voltage exceeding a given definite minimum is impressed upon the winding, and to open when the voltage reaches or falls below the said definite minimum. This switch is indicated only diagrammatically, as it may be of any well-known and approved form and in itself forms no part of our present invention.

26 indicates a diagrammatic representation of the field circuit of the generator, which, by means of a suitable spring contact 27, hereinafter described, and forming a part of the switch mechanism 18, is connected across the generator terminals,—the lines 28 and 29 leading from the generator field and from the positive side of the line 3 to the contact mechanism 27 above referred to and forming a part of the switch mechanism 18 hereinafter described.

30 indicates a lamp regulator between the generator or battery and the lighting load 6, which may be of any well-known form, adapted to keep the voltage on the lines approximately constant notwithstanding the varying voltage of the battery or generator. This regulator may be of any well-known form and method of operation and forms no part of our present invention.

$30^a$ indicates a wire connecting the regulator 30 with the load 6.

31—32 indicate auxiliary leads which may be introduced in the system, if desired, in order to permit giving the battery an extra or "freshening" charge from some exterior source of current, when the car is standing in a railroad yard with a suitable supply of direct current available. Such auxiliary charging from an exterior source, however, is only necessary if the car should stand for a period of, say, a week or more without operation, as in such cases a battery has a tendency to become discharged through internal leakage when left uncharged or without being used for a period of several days or more.

Coming, now, to the switch 18, which is an important feature of our invention,—33 and 34 indicate a pair of coils with energizing windings suited to the voltage of the system with which the switch is to be used. Coil 33 is connected by lead 35 to the maximum charge contact 11 of the recording dial 10. Coil 34 is connected by lead 36 to the maximum discharge contact 12 of the recording mechanism. The other terminals of the coils 33—34 are tapped to the common wire 37, which is tapped to the negative side of the main line at suitable point, as at 38. It, therefore, follows that when the hand 13 closes the circuit with either contact 11 or contact 12 the coil 33 or the coil 34 will be energized.

39 indicates a switch-arm provided with a plunger 40, which is preferably of soft steel and is adapted to be drawn into the interior of either coil 33 or 34 by the energizing of either of said coils. The plunger 40 is suitably pivoted to the switch-arm 39.

41 indicates a roller at the lower end of the arm 39 and which bears against a plate 42 which is seated against a suitable spring, as 43, held in a stationary support 44, whereby, when the switch-arm,—which is pivoted at a suitable point, as at 45, between the plunger and the spring-seated plate 42,— is drawn to one side or the other by the drawing of the plunger into one of the coils, the bearing of the spring against the lower end of the roller causes the switch to be yieldingly held in that position even after the current has been cut off from the coil, until the other coil is energized to positively draw the plunger in the other direction.

46 indicates a suitable carbon contact near the upper end of the switch 39, which is adapted, when the arm 39 is operated by the coil 34, to make contact with the contacts 20 and 23 and to break the circuit between said contacts when the coil 33 is energized.

47 indicates a sliding contact, which is adapted to engage with contact 17 and also with the contact 48, which is a suitable metal block connected by wire $22^a$ to line 22 which is also connected to the carbon contact 23. The sliding contact 47 is so proportioned and contacts 17 and 48 are so located that contact 47 will not leave contact 17 when moving to the right until it is closed with contact 48, and vice versa, in order to prevent the load itself from being cut off when the battery is being transferred from charge to discharge, and vice versa. The contact 47 is connected with the regulator 30 by a wire $30^b$. The contact 27, other and preferred forms of which will be described hereinafter and which is in the field circuit of the generator, is suitably designed so that it will not open until after carbon block 46 has opened the main line circuit between 20 and 23, and will close when the coil 34 is operated, before the circuit between 20 and 23 is closed. The purpose of this is to have the field of the generator cut off after the load is removed from the generator and to be cut on before the load is cut on, allowing the field to begin building up. The contact 27 in the diagrammatic form illustrated in Fig. 1 is operated by a cam or button as $27^a$ on switch-arm 39.

In order to make clear the operation of the apparatus as diagrammatically illustrated in Fig. 1, let it be understood that a train with axle equipment may be operating under the following conditions:

1. With the train above critical speed, the generator connected to the main line and the storage battery charging.

2. With the train above critical speed, the charge of the storage battery just completed, and the contact hand of recording mechanism touching contact 11.

3. With the train above critical speed, the storage battery discharging, and with the indicating hand traveling clockwise between 11 and 12.

4. With the train above critical speed and the full discharge point of the storage battery just reached, in which case the hand 13 has just touched contact 12.

5. With the train below the critical speed, or stopped, and the battery discharging, in which case the indicating hand 13 is traveling clockwise somewhere between 11 and 12.

6. With the train below critical speed, or stopped, and the full discharge of the storage battery reached so that the hand 13 touches contact 12.

7. With the contact as in 6 above just reached, the train starting and reaching critical speed after having been below critical speed or stopped. In this case the charge is commencing and the indicating hand 13 begins to move in a contra-clockwise direction from the contact 12 toward the contact 11.

8. While above critical speed and with battery charging, a break may occur in the line between the battery and main line of the meter or in one of the connections of the battery itself.

Taking up these conditions one by one, the operation is as follows:

1. In this case let us suppose the train to be above critical speed, and the lever 39 on the switching mechanism 18 moved so as to bring the contact 46 against contacts 23 and 20, closing the circuit between them. In this case the slide contact 47 will be in contact with contact 48 so that the current passes from circuit 3, line 22, to contact 48, contact 47 and thence to the load 6. Current is also passing from 23 to 20, through contact 46 and therefore through line 19 to the charge side of the differential meter shunt 9, thence through line 15 to the storage battery 5, and thence back to the generator through line 2. Under this condition the battery is charging, the necessary extra compensating charge being given by the adjustment of the differential shunt within the meter in the manner described in the said patent to Robert C. Lanphier. The load itself is being carried by the generator and is not being passed through the measuring system of the meter, as this would, of course, cause an error in the registration.

2. With the conditions as in 1, the charge continues until the indicating hand touches contact 11. This causes the energizing of coil 33, which thus pulls switch-arm 39 to the left and opens the main circuit between 23 and 20. This immediately cuts off the charge to the battery through line 19. At the same moment the sliding contact 47, moving over into connection with contact 17, transfers the load 6 from the generator to the battery. Current then passes from the storage battery 5, through the line 15 to the meter, through the discharge side 8 of the differential shunt, and by wire 16, contacts 17 and 47, and regulator 30 to the load 6, and back through line 2 to the battery. The current cannot pass from the battery back to the generator as the circuit line 22 from the generator is open between contacts 23 and 20. When the arm 39 moves to the left the field circuit 26 of the generator is also opened by the opening of the auxiliary contact 27. This cutting off of the field of the generator causes the opening of the voltage releasing switch 21 so that the generator is not generating any voltage and is not connected in any way to the line on the positive side.

3. Having reached the condition described in condition 2, it will be readily seen that the battery is now discharging and is carrying the entire load, the indicating hand 13 of the meter moving clockwise toward contact 12. The generator is idle and is generating no voltage.

4. The discharge in condition 3 having been continued until the battery is discharged to about seven-eighths of its rated capacity, the contact 12 having been set accordingly, the hand 13 touches contact 12. This causes the energizing of coil 34, drawing into it the plunger 40 and moving the upper part of the switch-arm 39 to the right. This first closes the contact 27, thereby causing the energizing of the field circuit 26 of the generator. This immediately causes the low voltage switch 21 to close the circuit between lines 3 and 22 provided the train is running above critical speed. Immediately thereafter the block 46 closes the circuit between 23 and 20 and the slide 47 engages contact 48 and disengages contact 17 so that the lamp load is transferred from the battery to the generator. The apparatus is now in the condition first described and the operation begins again.

Condition 5 needs no discussion.

6. Suppose, on the other hand, that the train is below critical speed or stopped when the hand 13 reaches contact 12 on discharge. The charging of the storage battery cannot begin again as the generator is not energized, or is not sufficiently energized, to operate the low voltage release switch 21 and let the current pass from circuit 3 to line 22. Therefore, though the switch 39 is moved to the right and contact 46 closes the circuit between 23 and 20, no current passes from line 22 through 23 and 20 as the switch 21 remains open. Under such conditions the current will pass from the battery through line 15, through the charge side 9 of the differential shunt, through line 19, through 20 to 23, thence to contact 48, slide 47, and to the load 6. Owing to the fact that the meter has a slower rate of rotation when the current passes through the charge side of the shunt 9 than when through the discharge side 8, as is described in the said Letters Patent to Robert C. Lanphier, there will be a slight error in the registration of the meter; but such a condition occurs very rarely and for such brief periods that the error will not be appreciable in the general or practical operation of the apparatus.

7. Assuming the conditions the same as in the last condition 6, with the meter having the hand 13 at contact 12 and the train below critical speed, let us assume that the train gets up to or above critical speed. In this case the low voltage switch 21 closes the line circuit between 3 and 22, and as the voltage of the generator is higher than that of the battery, the current passes from 23 to 20 through the side 9 of the differential shunt of the meter into the battery through line 15, as before. Current also passes through contacts 48 and 47 to load 6, and the operation becomes exactly as in condition 1, the charging of the battery continuing and the hand moving contra-clockwise as long as the train remains above critical speed and until the battery is fully charged. Condition 1 is thereupon repeated.

8. A special condition may sometimes occur, due to a break in the line from battery 5 either to the meter or to line 4, or the occurrence of a break in one of the battery connections between cells. In ordinary existing types of axle equipment, such a break causes serious trouble, even when guarded against by various fuses or protective devices. In our system, with the generator having the characteristic of constant current regardless of speed, if such a break should occur, the sudden reduction of charging load to the battery will not cause an excessive rise in voltage and such a break will do no harm as long as the train is running above critical speed. Of course, with such a break after the train drops below critical speed, lights cannot be burned until repairs have been made.

The above is the general description of the operation of our devices with the forms of mechanism indicated diagrammatically in Fig. 1 of the drawings. Figs. 2, 3 and 4 illustrate in detail the preferred form of switching mechanism.

Referring now to Fig. 4,—19 and 22 indicate, respectively, the same wires as are correspondingly numbered and described in the description of the devices shown in Fig. 1 and similarly connected. 20$^a$ and 23$^a$ indicate contact blocks which are spring-seated, as by springs 100 and 101, and are connected, respectively, with wires 19 and 22, and they take the place of and operate on the same principle as contacts 20 and 23 in Fig. 1. 39$^a$ indicates a lever pivoted centrally of its length, as at 45$^a$, and which is the preferred form of the lever 39 shown in Fig. 1. It is provided with a downward-depending arm 39$^b$ which carries a roller 41$^a$ bearing on a plate 42$^a$ which is pressed upward against the roller 41$^a$ by a spring 43 in block 44$^a$. These devices correspond in their operation with the parts numbered 39, 41, 42, 43, 44 in the mechanism shown diagrammatically in Fig. 1. 40$^a$ and 40$^b$ indicate plungers, which are adapted to enter, respectively, the coils 33$^a$ and 34$^a$, which correspond with the coils 33 and 34 above described in the description of the form shown diagrammatically in Fig. 1, and which operate in the same manner. The coil 33$^a$ is connected in the same manner as 33 with the contact 11 of the meter and the coil 33$^a$ is connected in the same manner as coil 34 with the contact 12 of the meter, and both 33$^a$ and 34$^a$ are connected through the common line 37 in the same manner as shown in Fig. 1 to the negative side of the battery. 47$^a$ indicates arc-shaped plates, preferably of spring material and secured to each side of the lever 39$^a$ upon the right-hand side of its pivotal point, as is best shown in Fig. 2. The arc is concentric with the pivotal point of the lever 39$^a$. 17$^a$ and 48$^a$ indicate arc-shaped plates which correspond in their action and function with contacts 17 and 48 in Fig. 1. The contacts 48$^a$ and 17$^a$ and the contact plates 47$^a$ operate in the same general manner and with the same results when the lever 39$^a$ swings as do the contacts 17, 47 and 48 in the diagrammatically shown apparatus in Fig. 1, the contact 17$^a$ being connected to lead 16 and the contact 48$^a$ to lead 22 by wire 22$^a$. The arc-shaped plate 47$^a$ is made of sufficient length and the arc-shaped contacts 48$^a$ and 17$^a$ are so placed that as the lever swings the contact 47$^a$ does not leave one until it has come in contact with the other in the same manner as described above in describing contacts 47, 17 and 48. 49 indicates a stationary arc-shaped plate which bears upon the spring contacts 47$^a$ upon the opposite side of the lever 39$^a$ so as to hold the parts in proper position as they move as shown in Fig. 2. The contact switch 27, 27$^a$ shown diagrammatically in Fig. 1 is shown in another form at 27$^b$, in Fig. 4, but the construction of this switch separately considered forms no part of our present invention, and the forms shown are simply suggested forms, the operation of which will be readily understood. 46$^a$ indicates a contact block, preferably of carbon, which is mounted upon the left-hand arm of lever 39$^a$ and which is adapted, when that arm of the lever is raised, as hereinafter described, to be brought into contact with the spring-seated blocks 20$^a$ and 23$^a$ and establish electrical connection between them in the same manner that block 46 connects with blocks 20 and 23.

Without going fully into the entire details of the operation of this mechanism as described above, it is enough to say that, generally, it operates in precisely the same manner as does the switching mechanism 18 hereinbefore described. In other words, when coil 34$^a$ is energized by the hand of the lever 13 coming in contact with contact 12, the plunger 40$^b$ is drawn down into coil 34$^a$, which corresponds with the swinging of arm 39 to the right in Fig. 1. This causes contacts 46ª to be lifted against the contacts 20ª and 23ª, electrically connecting them and effecting the same result as when the lever 39 in the diagrammatic form shown in Fig. 1 is swung to the right so as to cause contact 46 to bring contacts 20 and 23 in electrical contact. At the same time the contact plate 47ª is moved away from contact 17ª upon contact 48ª, which causes the same connections to be made as when sliding contact 47 is swung to the right so as to connect it with contact 48 in the diagrammatic form above described. When, on the other hand, coil 33ª is energized, plunger 40ª is drawn downward, rocking the lever 39ª in the opposite direction and moving contact 47ª into connection with contact arm 17ª and moving contact block 46ª away from contacts 20ª—23ª, thus electrically separating them. When the coil 34ª is energized and the right-hand arm of the lever drawn down, the switch 27ª is closed, operating in the same manner as switch 27 in the diagrammatic view in Fig. 1 and above described, so as to connect and disconnect the field winding 26.

In Fig. 3 we have shown another improved and preferred form to take the place of the switch 27 and which shows the switch in a convenient and compact form. In this case 50 indicates a plunger which slides through a contact plate 51, to which is attached wire 59 corresponding with wire 29 in the diagrammatic view. By means of a spring 52 the plunger is yieldingly held in an upright position. The plunger is mounted in a casing 54 which incloses an insulating sleeve 53 which separates the contact plate 51 from the cylinder 54. The plunger 50 is mounted on a metal sleeve 55 which slides in the insulated sleeve 53 and which has supported on its lower end a carbon contact 56. The spring 52 is of suitable conducting metal to connect plate 51 with the sleeve 55 and carbon contact 56. 57 indicates a carbon contact block which is slidingly mounted in the casing 54 and by means of a suitable spring, as 58, is electrically connected with the casing, which is connected by a wire 60 corresponding with wire 28. This device is adapted to be placed in position where the plunger may be brought into contact with a suitable knob, as 39ᵇ, on lever 39 in Fig. 4, so that the plunger 50 may be pressed downward when the coil 34ª is energized. As the plunger 50 is pressed downward the carbon block 56 is brought into contact with carbon contact block 57 and thus an electrical connection is established between wires 59 and 60. We have illustrated this switch only as showing a convenient form of operating switch, but do not claim it as any part of our present invention.

It sometimes happens that for one reason or another there might be a stoppage in the working of the mechanism, which would cause the hand 13 to remain in contact with contact 11 or contact 12 in the meter 10, which, unless means were taken to prevent it, would cause a continuous current to flow through the solenoids 33—34 or 33ª—34ª as long as the contact was maintained. This might cause a burning out of the solenoids, or other troubles, and in order to prevent this we have devised mechanism which is shown in Fig. 4. In this case the plungers 40ª and 40ᵇ are provided with flanges 61—62 which are formed integral therewith, or in any way secured upon said plungers. Upon the casing of the solenoid in each case is mounted a switch composed of members 63—64, of which the member 63 is of spring material. These switch members are provided with contacts 65—66 which are normally held in electric contact by the spring member 63 of the switch so that when the circuit is closed by the hand 13 of the meter 10 coming in contact with either contact point 11 or 12, as above described, the current flows through one or the other of the solenoids, as above described. The spring member 63 of the switch extends out and under the flanges 61—62 so as to be engaged by the said flanges when the plungers 40ª or 40ᵇ are moved into their respective solenoids in the manner above described, and thus, by the descent of the plunger, to separate the contacts 65 and 66 and prevent any further flow of the current. The operations of these will be easily understood. If the solenoid 33ª is energized in the manner above described by the hand 13 making contact through the contact 11, the plunger 40ª descends, and the flange 61, as the plunger descends, is brought in contact with spring member 63, thus opening the switch and breaking the circuit through the solenoid. The lever 39ª is, of course, held in position by the action of the roller 41ª on the spring-seated bearing 42ª until the solenoid 34ª is energized. The raising of the plunger 40ᵇ in solenoid 34ª has been effected by the lowering of plunger 40ª in the solenoid 33ª, which has caused the switch on solenoid 34ª to be automatically closed. As soon as the solenoid 34ª is therefore energized by the hand of the meter 10 coming in contact with the contact 12, the plunger 40ᵇ is lowered, opening the switch of the plunger 34ª in the same manner as above described. This movement, of course, raises the plunger 40ª in solenoid 33ª, which causes the switch buttons 65—66 to again come into contact, ready for the next energizing of the solenoid 33ª.

That which we claim as our invention and desire to secure by Letters Patent, is,—

1. In a system of electric train lighting, in combination, an electric generator adapted to be driven from the train axle and to generate a current after a critical speed has been reached, a storage battery, translating devices connected to said storage battery and to said generator, an ampere-hour meter connected to said battery to register the charge and discharge thereof and adapted to close the circuit between contacts at maximum charge and discharge of said battery, electric circuits connected with said contacts, a solenoid in the circuit from said maximum discharge contact of said meter, a second solenoid in the circuit from said maximum charge contact of said meter, a rocking switch member, means controlled by said solenoids for rocking said switch member in one direction or the other as said solenoids are respectively energized, contact devices connected to said switch and adapted, when said switch is swung in one direction by the closing of the contacts when the maximum charge is recorded by the meter, to connect the battery and the translating devices with the generator and when the contact has been closed at the maximum charge point of said meter, to disconnect said battery from said generator and connect said battery and the translating devices.

2. In an electric train lighting system, in combination, a generator adapted to be driven from the axles of said train, automatically-operated switching devices adapted to disconnect the generator armature from the circuit when its speed falls below a critical point, a storage battery, translating devices connected with said storage battery and the armature circuit of said generator, a meter connected with said storage battery and adapted to record the charge and discharge thereof and having contacts adapted to be closed when the maximum charge and the maximum discharge of said battery has been reached, electrical circuits connected to said maximum charge and maximum discharge contacts, a switch member, solenoids connected, respectively, with the maximum charge and maximum discharge contacts of said meter, mechanism operated by the energizing of said solenoids, respectively, to move said switch in one direction or the other, contacts on said switch and in said circuits adapted, when said switch is moved in one direction by the connection of one of said solenoids with the maximum discharge contact of said meter, to automatically connect said battery and the translating devices with said generator and, when said switch is operated by the energizing of the other solenoid connected with the maximum charge contact of said meter, to disconnect the field circuit of said generator from the generator circuit, then to disconnect said battery and the translating devices from said generator, and to connect said battery with said translating devices.

3. In combination, an ampere-hour meter, a solenoid, a circuit connecting said meter and said solenoid, mechanism in said meter adapted to close said circuit at a given point, switch mechanism operated by the energizing of said solenoid, a switch in the circuit connecting said meter and said solenoid held normally in a closed position, and means operated by said first-named switching mechanism to open said switch as said switching mechanism is operated on by said solenoid.

4. In combination, an ampere-hour meter, a storage battery connected therewith, circuits connected with said ampere-hour meter and adapted to be closed at given maximum charge and discharge points on said meter, a solenoid connected with each of said circuits, switching mechanism adapted to be operated by the energizing of said solenoids, a switch in the circuit connecting each of said solenoids with said meter normally in yielding closed position, and mechanism operated by said first-mentioned switching mechanism to open said switches as said switching mechanism is operated by the energizing of said solenoids, respectively.

5. In combination, an ampere hour meter, a pair of solenoids, circuits between said solenoids and said meter, mechanism in said meter adapted to close said circuits at given maximum charge and discharge points, plungers for said solenoids, a switching mechanism operated by said plungers, a switch on each of said solenoids in the circuit connecting the same with the meter and adapted to be normally closed, and mechanism operated by said plungers to open said switches as the said plungers are operated on respectively by said solenoids.

ROBERT C. LANPHIER.
ERVIN M. FITZ.

Witnesses to signature of Robert C. Lanphier:
    SINE LARSEN,
    CHAS. G. LANPHIER.
Witnesses to signature of Ervin M. Fitz:
    MILDRED FUNK,
    FORDYCE W. BROWN.